(12) United States Patent
Seman, Jr. et al.

(10) Patent No.: US 7,941,865 B2
(45) Date of Patent: May 10, 2011

(54) RECHARGEABLE BATTERY PACK AND OPERATING SYSTEM

(75) Inventors: Andrew E. Seman, Jr., White Marsh, MD (US); Daniele C. Brotto, Baltimore, MD (US); Danh T. Trinh, Parkville, MD (US); Fugen Qin, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 934 days.

(21) Appl. No.: 11/554,937

(22) Filed: Nov. 20, 2006

(65) Prior Publication Data

US 2008/0037779 A1  Feb. 14, 2008

(51) Int. Cl.
*G06F 13/10* (2006.01)
*G06F 13/00* (2006.01)
*G06F 21/00* (2006.01)
*G09F 9/00* (2006.01)

(52) U.S. Cl. ............... 726/34; 705/50; 705/60; 705/61; 713/194; 713/189; 726/36

(58) Field of Classification Search .................. 380/47, 380/44–46, 277–278; 713/168–170; 726/34, 726/36; 705/50, 60–61
See application file for complete search history.

(56) References Cited

U.S. PATENT DOCUMENTS

| | | | | | |
|---|---|---|---|---|---|
| 5,148,485 | A | * | 9/1992 | Dent | 380/46 |
| 5,253,294 | A | * | 10/1993 | Maurer | 380/264 |
| 6,369,727 | B1 | * | 4/2002 | Vincze | 341/131 |
| 6,429,622 | B1 | * | 8/2002 | Svensson | 320/106 |
| 6,975,092 | B2 | * | 12/2005 | Edington et al. | 320/106 |
| 7,519,985 | B2 | * | 4/2009 | Kawamura et al. | 726/2 |
| 2003/0072059 | A1 | * | 4/2003 | Thomas et al. | 359/167 |
| 2004/0179685 | A1 | * | 9/2004 | Soliman | 380/44 |
| 2005/0001589 | A1 | * | 1/2005 | Edington et al. | 320/128 |
| 2005/0005108 | A1 | * | 1/2005 | Harper | 713/165 |
| 2005/0099156 | A1 | * | 5/2005 | Brenner | 320/116 |
| 2006/0076924 | A1 | * | 4/2006 | Kim et al. | 320/112 |

FOREIGN PATENT DOCUMENTS

EP 0 903 665 A2 3/1999
EP 1780937 A1 * 5/2007

OTHER PUBLICATIONS

"Announcing the Advanced Encryption Standard (AES)," *Federal Information Processing Standards Publication*, U.S. Dept. of Commerce, Washington, D.C., US, Nov. 26, 2001, pp. 1-47.
International Search Report issued Feb. 14, 2007 in corresponding European Patent Application No. EP 06 12 3311.

* cited by examiner

*Primary Examiner* — Ponnoreay Pich
*Assistant Examiner* — Sayed Beheshti Shirazi
(74) *Attorney, Agent, or Firm* — Harness, Dickey & Pierce, P.L.C.

(57) ABSTRACT

A method and system for authenticating a smart battery having a smart battery and an electronic device. Both the device and the smart battery generate encrypted random strings using key material based by A/D noise bits as a seed value. A pseudo random number is generated from the A/D noise that is transmitted to both the electronic device and the smart battery. The pseudo random number is used by both devices as a key index to select one of a plurality of keys stored in separate key libraries. The keys, or key material, is used to execute an encryption algorithm. The two encryption data streams are then compared to authenticate the smart battery.

18 Claims, 8 Drawing Sheets

RECHARGEABLE BATTERY PACK AND OPERATING SYSTEM

DOMESTIC PRIORITY INFORMATION

This application claims priority under 35 U.S.C. §119 on U.S. provisional application 60/731,857, filed Nov. 1, 2005, the entire contents of which are hereby incorporated by reference.

BACKGROUND OF THE INVENTION

1. Field of the Invention

The present invention relates generally to rechargeable batteries and more specifically to a smart battery pack for use with an electronic device, such as a charger or a power tool. In one exemplary embodiment, the invention calls for executing a process for identification and authentication between a smart battery pack and a charger or tool as a prerequisite to performing other operations.

2. Description of the Related Art

Battery packs for portable power tools, outdoor tools, and certain kitchen and domestic appliances may include rechargeable secondary batteries, such as lithium ion, nickel cadmium and lead-acid batteries that may be recharged rather than replaced.

Products that use rechargeable batteries are prevalent throughout the workplace as well as in the home. From house wares to power tools, rechargeable batteries are used in a variety of different applications.

Depending on the intended environment of use, a user may select a rechargeable battery having one or more particular attributes. A user will typically choose a particular rechargeable battery by balancing numerous factors determined by the intended use such as power, weight, cost, reliability, and others. In particular, some users of battery energized equipment, such as power tools, may have a particular need for batteries having enhanced power and run time. In other applications, the cost of the battery may outweigh the need for enhanced performance. As a result, numerous choices exist for users of rechargeable batteries that satisfy a variety of needs and may be used in different applications.

Since numerous types and chemistries of rechargeable batteries exist, it is important that a user select a rechargeable battery that is properly designed for its intended use. Many electrical devices, such as power tools and chargers, are specifically designed to function properly only with rechargeable batteries having a particular chemistry and attributes.

Sophisticated portable electronic devices, such as power tools and chargers, are designed to operate under narrowly defined conditions. As these devices have advanced, so too has the development of rechargeable batteries with more sophisticated intelligence, also known as smart batteries that produce accurate and optimal operating conditions when charging and/or powering a device. Without a properly designed power source, the device, whether a power tool or a charger is not likely to perform to its full potential.

However, conventional battery packs, chargers and tools do not possess an effective and secure methodology for authentication and identification of packs when used in combination with other devices.

SUMMARY OF THE INVENTION

In one exemplary embodiment, the invention relates to a rechargeable battery pack system and operating system that identifies and authenticates a rechargeable battery source for a corresponding application and/or environment.

In another exemplary embodiment, the invention relates to a rechargeable battery pack system and operating system that identifies and authenticates a rechargeable battery source for a corresponding application and/or environment using a defined encryption algorithm such as the Advanced Encryption Standard ("AES") developed for the National Institute of Standards and Technology ("NIST").

In another exemplary embodiment, the invention relates to a rechargeable battery pack system and operating system that identifies and authenticates a rechargeable battery source for a corresponding application and/or environment using an encryption methodology having an arbitrary key such as a 128 bit key value and 64 or 128 bit message (random number to be encrypted.)

In another exemplary embodiment, the invention relates to a rechargeable battery pack system and operating system that identifies and authenticates a rechargeable battery source for a corresponding application and/or environment selecting one or more encryption keys from a library of arbitrary keys, such as for example, 8 or 16 keys, that are selected by a distilled value of an preselected message.

In another exemplary embodiment, the invention relates to a rechargeable battery pack system and operating system that identifies and authenticates a rechargeable battery source for a corresponding application and/or environment having an encryption key based on a random number generated using A/D noise bits as a seed value and an xor-add-shift algorithm to provide a Pseudo Random Number Generator (PRGN).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
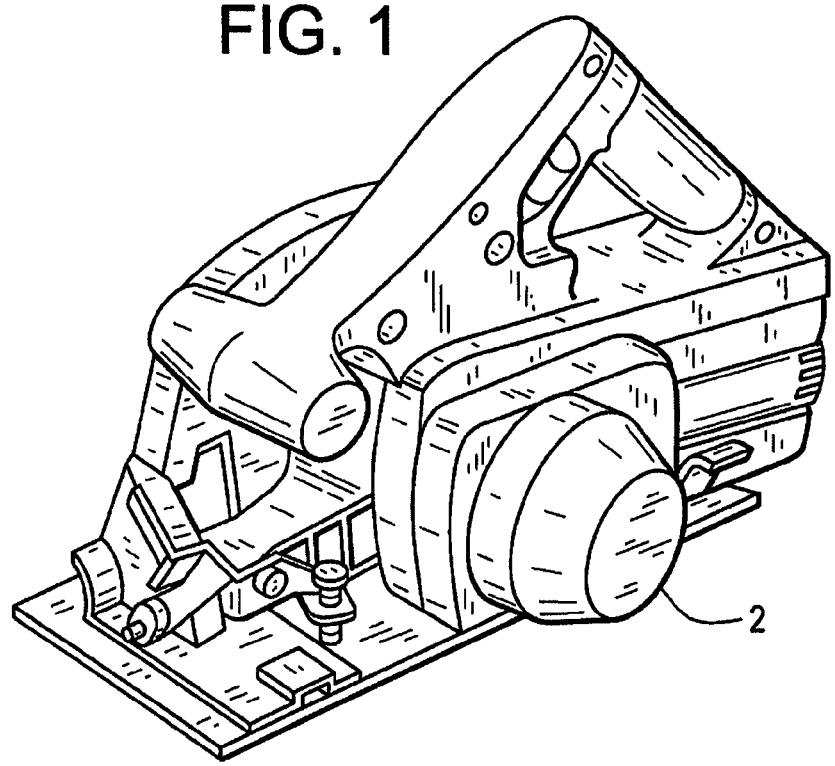
FIG. 1 is a block diagram showing several examples of electronic devices with a rechargeable battery pack.
Figure 1:
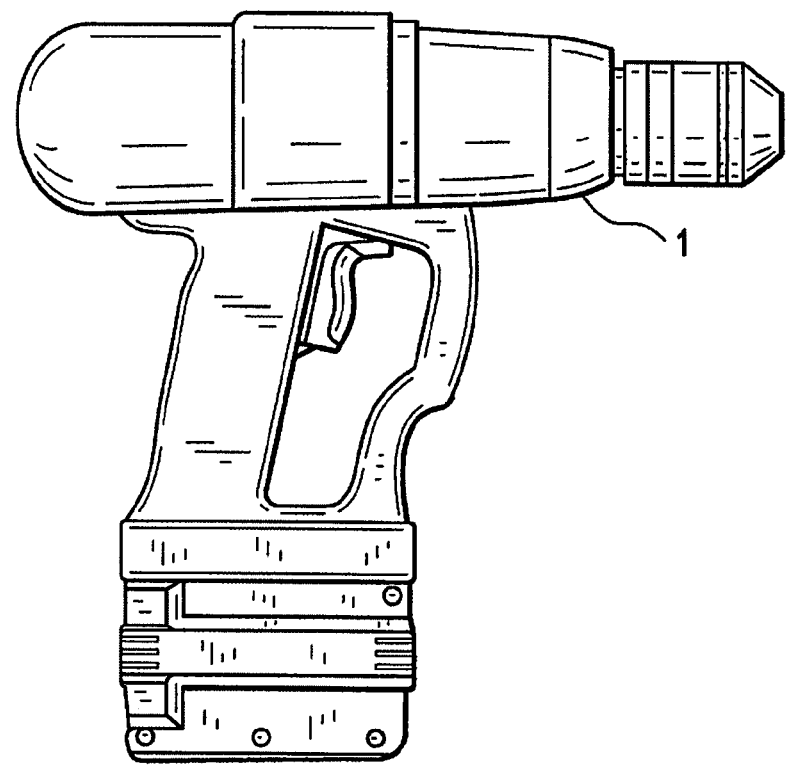

Referring to FIG. 1, there are shown various electronic devices in accordance with an exemplary embodiment of the present invention. The system includes an electronic device (such as a power tool or a charger), and a rechargeable battery pack, such as a smart battery.

The power tools shown in FIG. 1 are cordless hand-held power tools. Such power tools may include a cordless drill 1 or circular saw 2 as shown, but may also include a wide array of other devices such as reciprocating saws, sanders and radios. While power tools are shown in FIG. 1, the disclosed rechargeable battery pack and authentication/identification methodology may be employed with other types of electrical devices that use a rechargeable smart battery.

Figure 2:
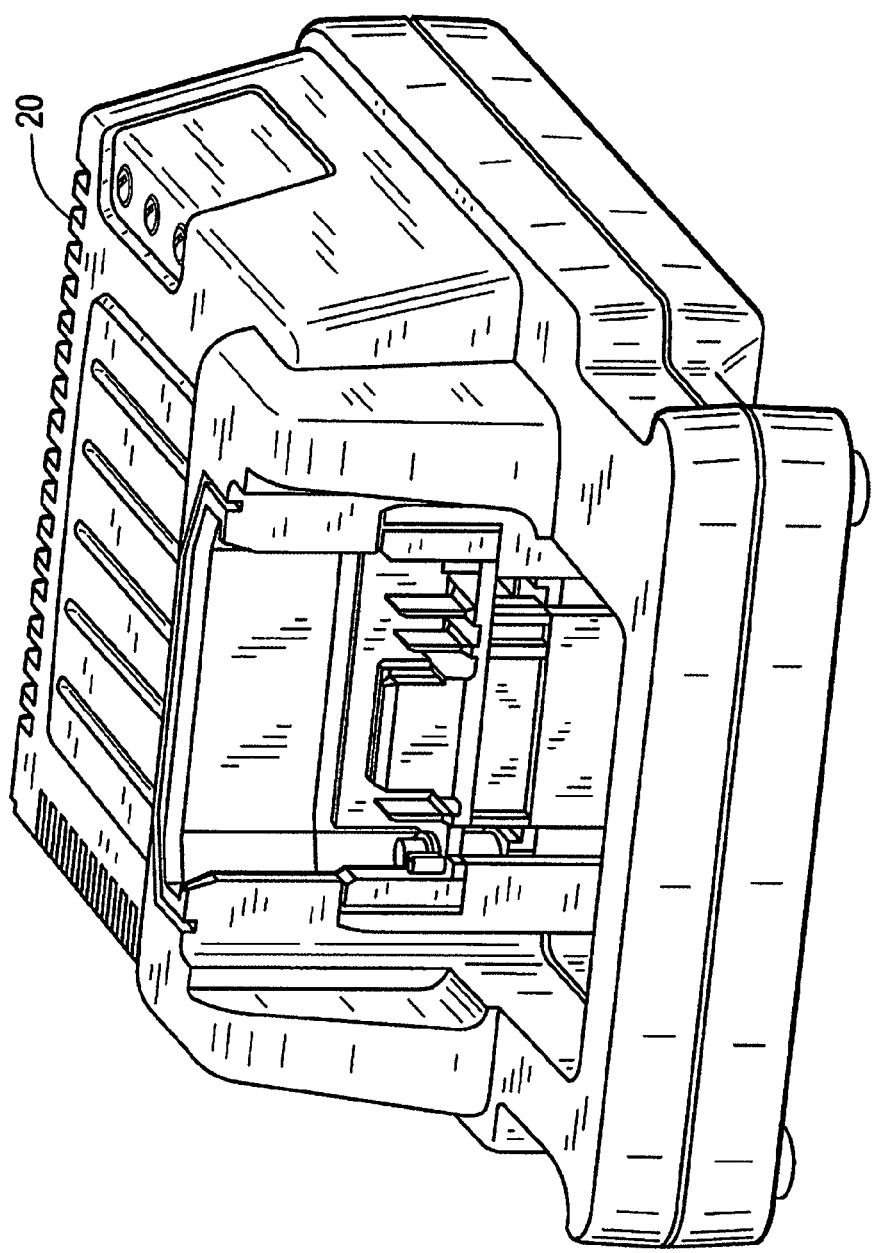
FIG. 2 is a perspective view of an exemplary embodiment of a smart battery.
Figure 3:
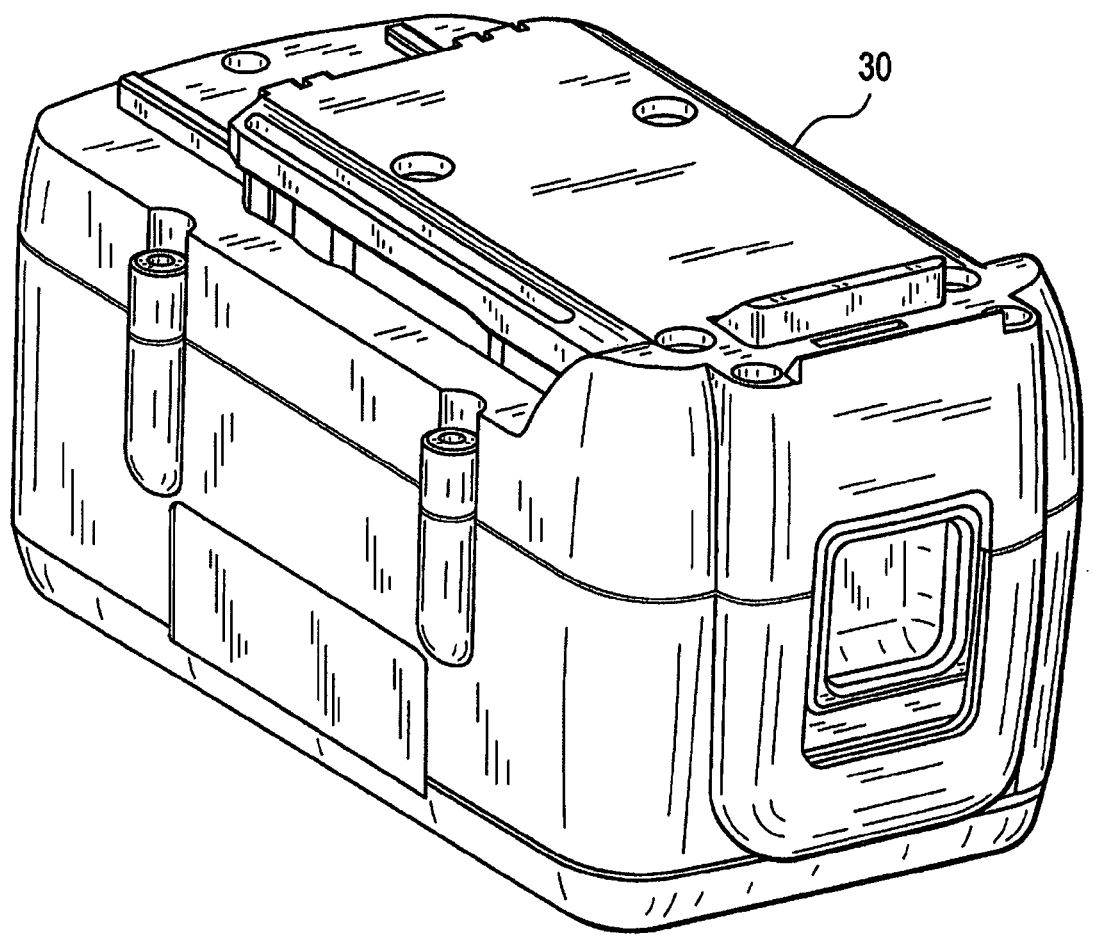
FIG. 3 is a perspective view of a battery charger according to an exemplary embodiment of the invention.

The charger 20 shown in FIG. 2 is representative of a collection of battery chargers capable of receiving and energizing a rechargeable smart battery 30. There are numerous battery chargers known in the art that are used for recharging a variety of rechargeable batteries having, among other things, unique chemistries. In many cases, a charging methodology is utilized in the charger for a particular battery pack to ensure optimum results. For example, the charging method used to recharge a first type of rechargeable battery may not be effective in recharging a second rechargeable battery having a different chemistry (such as Ni-Cad), cell construction or other functional attributes.

Figure 4:
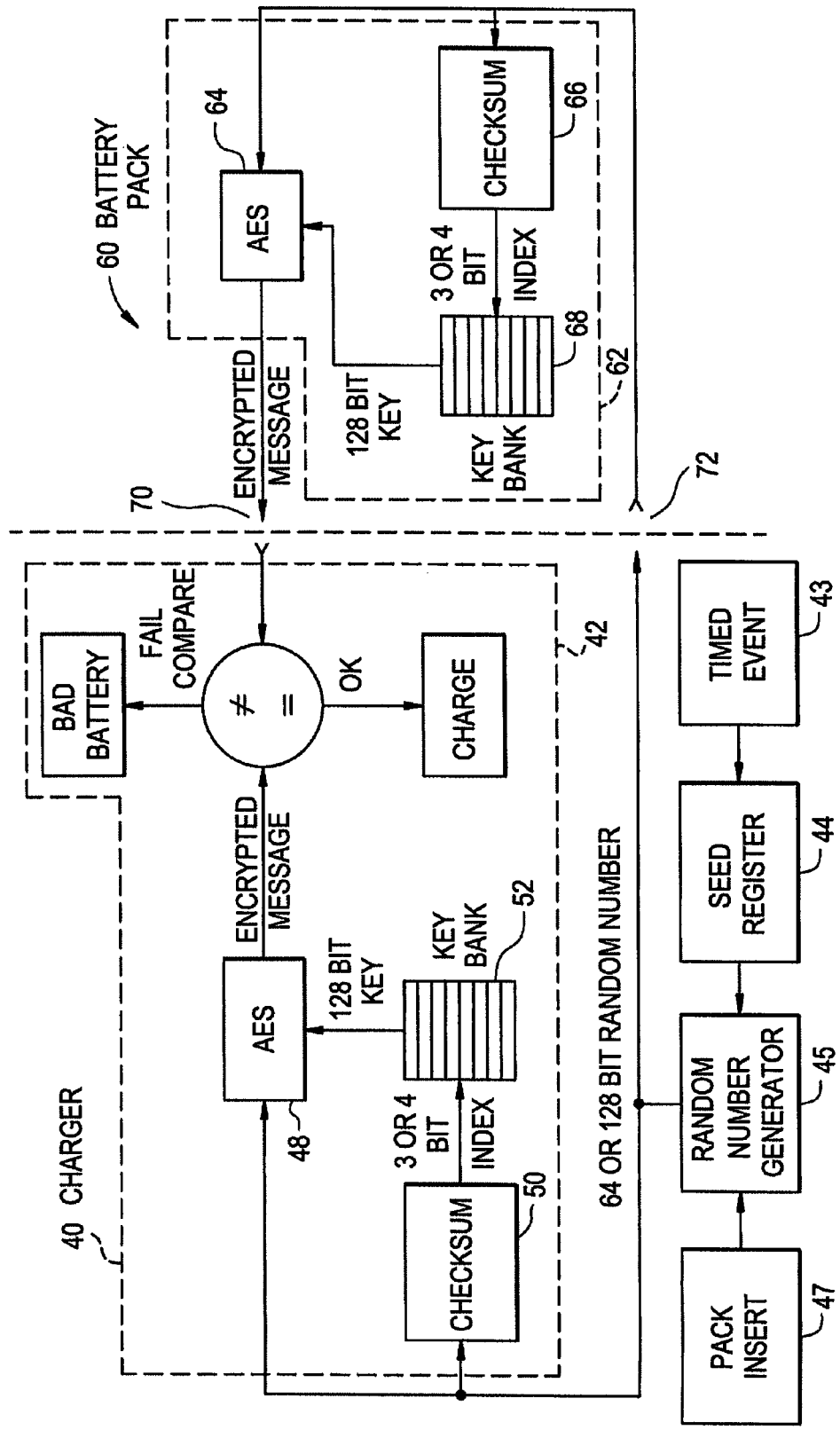
FIG. 4 is a block diagram of the combination of an electronic device (i.e., a charger) used in combination with a rechargeable smart battery.
Figure 5:
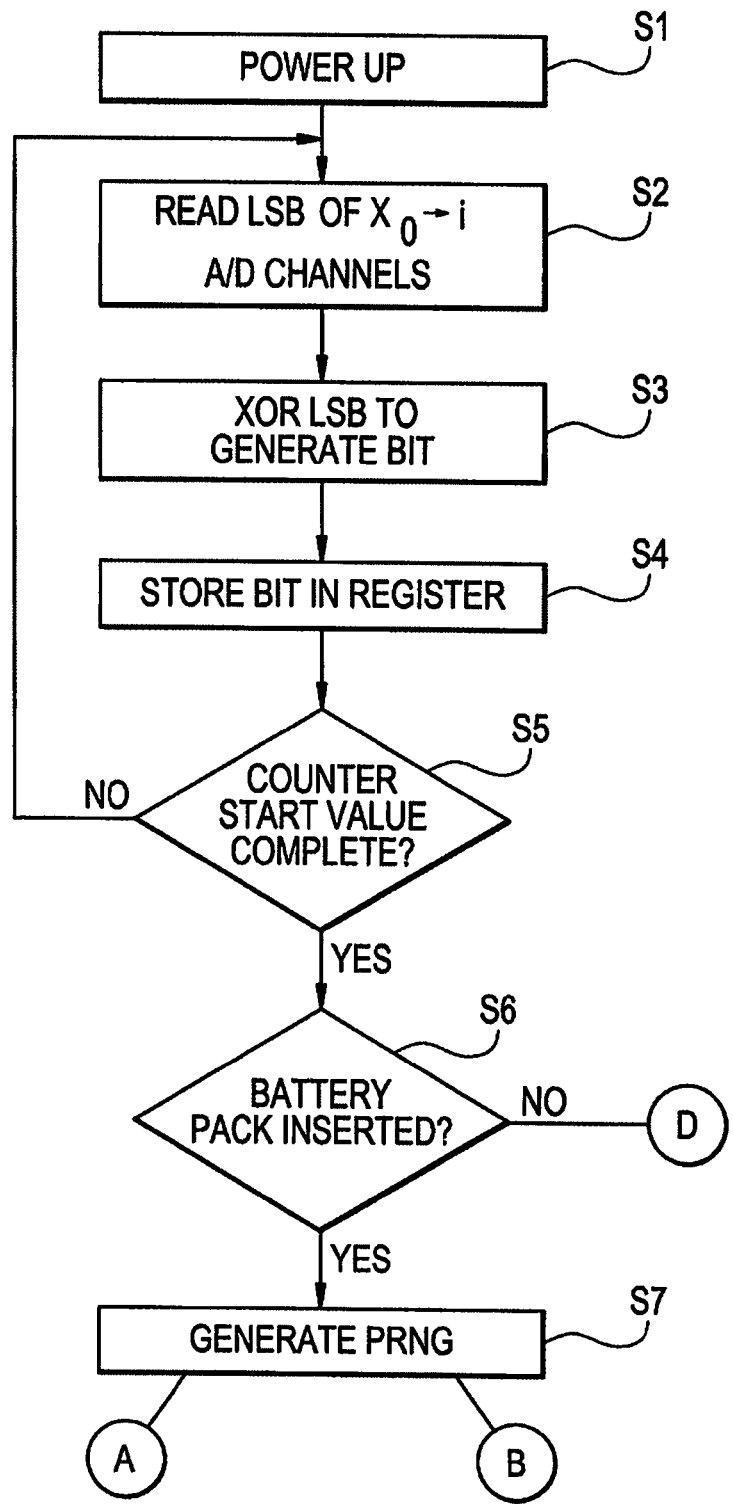
FIG. 5 is a flow diagram of a portion of an identification/authentication process according to an exemplary embodiment of the invention.
Figure 6:
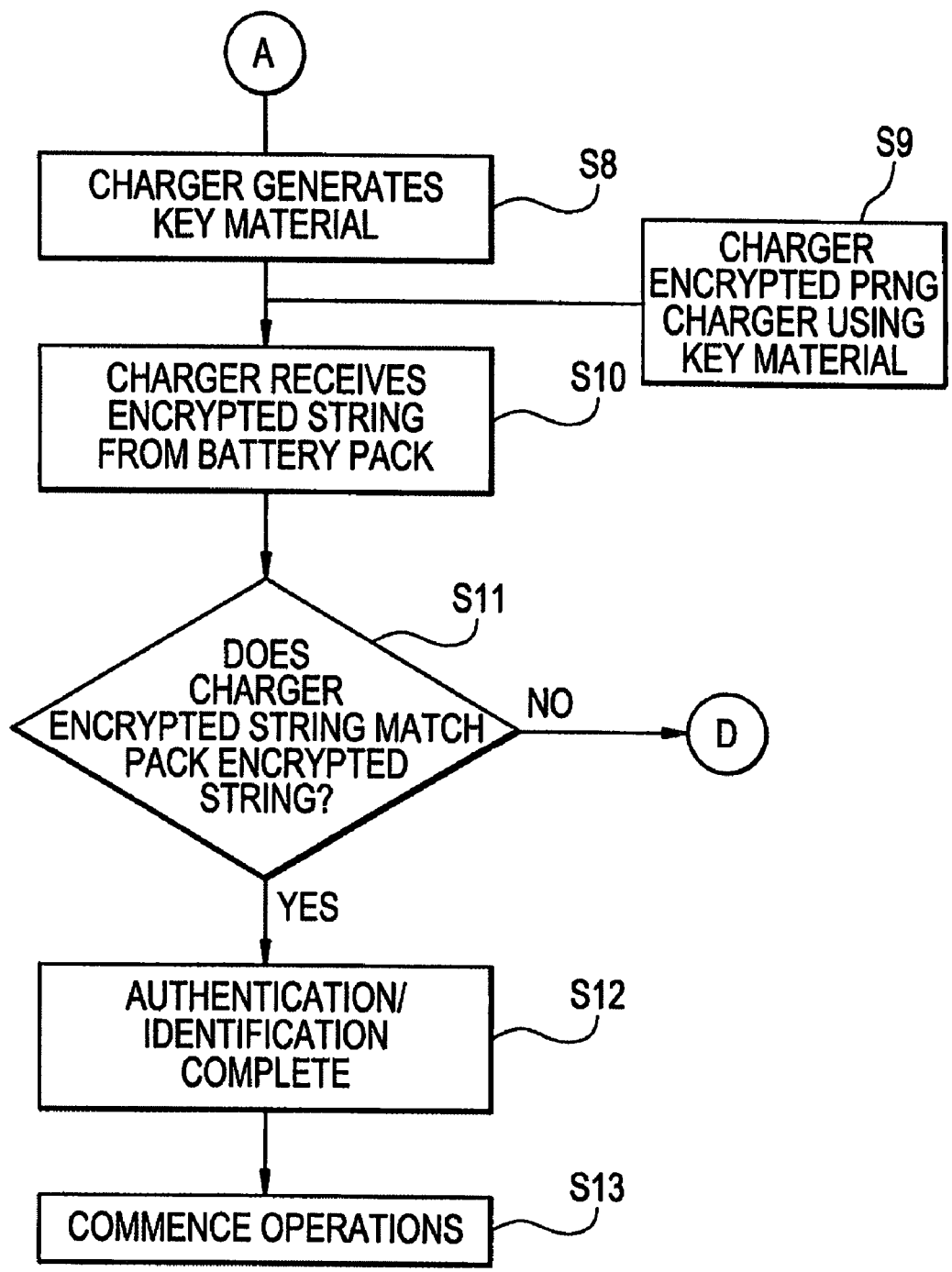
FIG. 6 is a flow diagram of a portion of an identification/authentication process according to an exemplary embodiment of the invention.
Figure 7:
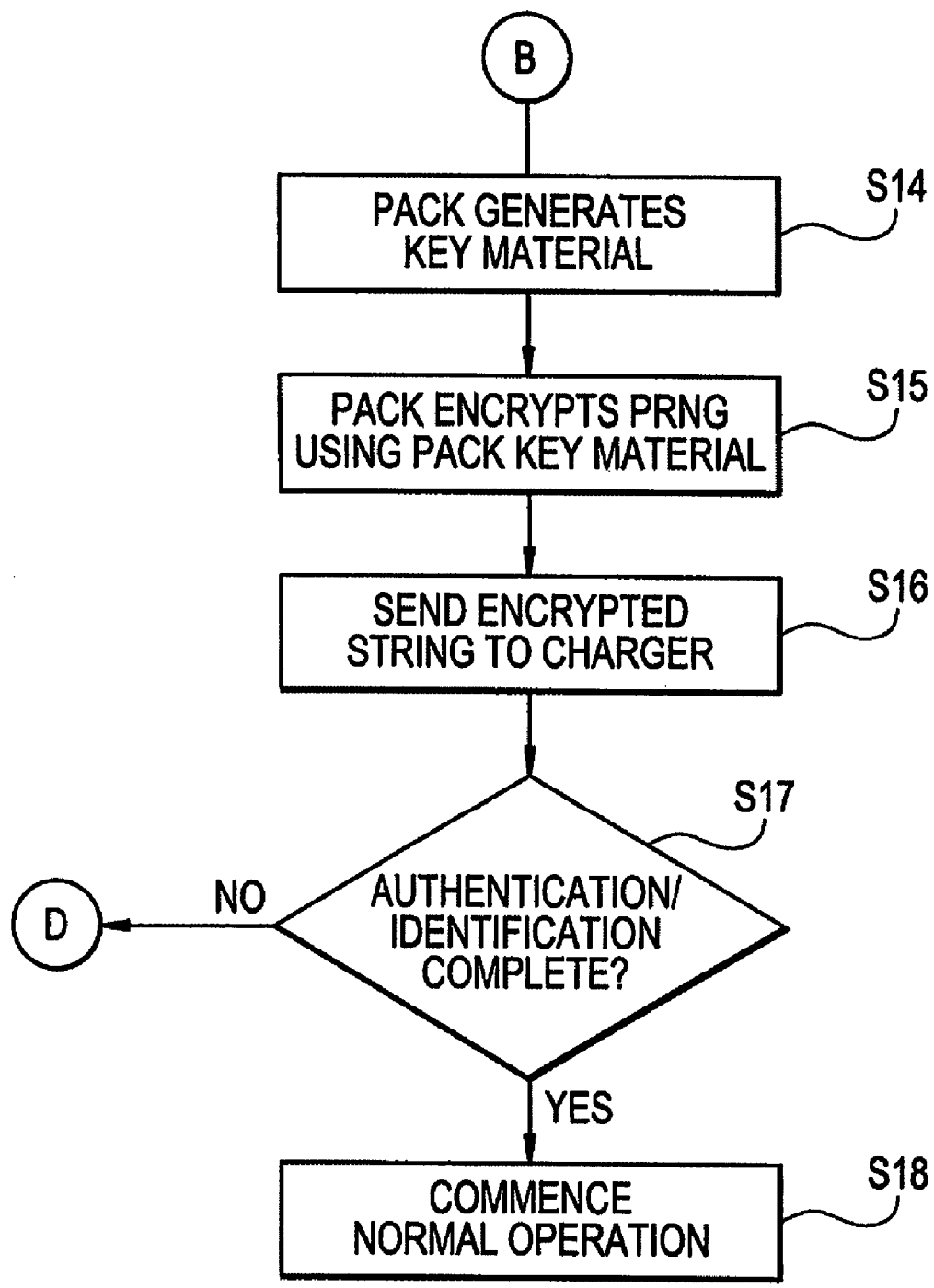
FIG. 7 is a flow diagram of a portion of an identification/authentication process according to an exemplary embodiment of the invention.
Figure 8:
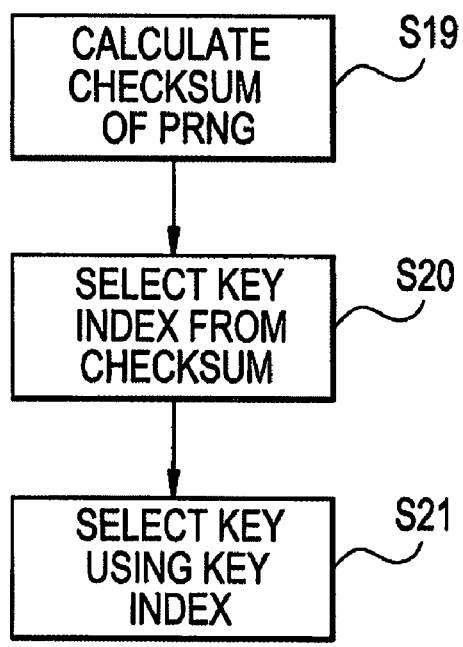
FIG. 8 is a flow diagram of a portion of an identification/authentication process according to an exemplary embodiment of the invention.

FIG. 4 is a block diagram that illustrates the data flow between constituent elements of a system that are capable of executing an authentication/identification protocol according to an exemplary embodiment of the invention. For purposes of discussion, the electronic device described is a charger. However, it should be realized that any electronic device, specifically including a power tool, having a similar interface and internal processing system could be utilized without departing from the spirit of the present invention. The battery pack is preferably a smart battery.

FIG. 4 shows a two pin connection between the charger 40 and the battery pack 60. The connections 70 and 72 provide for data communications between the pack 60 and the electronic device 40 along a data bus. While a two pin connection is shown, other connection arrangements may be used that are capable of communicating the information set forth below for authentication and identification of the pack by the electronic device.

The charger 40 contains a central processing unit, i.e. charger CPU 42, that is capable of performing multiple functions, including execution of an authentication/identification process as set forth and explained hereinafter.

The charger CPU 42 is first capable of generating a pseudo random number based on a seed value and the timing of unrelated asynchronous events. These asynchronous events include timed random events that occur within the electrical environment of the electronic device, the pack or the combination of both, such as sensed inputs of the temperature, user interaction and semiconductor noise. The aforementioned list is for illustration purposes only. Other events may be used that do not depart from the spirit and scope of the invention. The seed value can be determined by detecting noise in the A/D converters. One method of detecting noise involves reading the least significant bit of non-zero A/D channels and using these as the seed value. This will provide an indeterminable number because of the unpredictability of the LSB value at a given time. To further augment this process an A/D channel with a time varying signal could be included in the generation of the seed value. The charger CPU 42 contains a seed register 44 for storing a predetermined number of bits based on detecting noise from the A/D channels. When the charger CPU 42 detects a particular event, it calculates a pseudo random number based on the contents of the seed register 44 at the time of the event. In an exemplary embodiment, the pseudo random number is generated upon insertion of the pack 60 into the charger 40 when an electrical connection is formed between the two units. This event is detected by the charger CPU 42 in the exemplary embodiment as shown schematically by "Pack Insert" 42. In one embodiment, this process is only executed upon the initial insertion of the pack 60 into the charger 40. However, the event which triggers generation of the pseudo random number may vary without departing from the scope and spirit of the invention.

The charger CPU 42 is also capable of executing a CHECKSUM operation upon generation of a pseudo random number. The CHECKSUM operation receives the generated pseudo random number for calculating a key index. The portion of the charger CPU 42 that executes the CHECKSUM is schematically shown as element 50. The key index may be calculated using either the entire pseudo random number or portions thereof. In one exemplary embodiment, selected bits of the pseudo random number may form the key index. Other variations for determining an arbitrary key index based on the pseudo random number are possible.

The charger CPU 42 also contains a portion of memory designated as a key bank 52. The key bank 52 contains at least one, and preferably more than one, arbitrary key that may be used for encrypting a data stream. In an exemplary embodiment, the key bank 52 contains a plurality of keys having the same length, for example a 128 bit key. Selection of a key from the key bank 52 using the key index based on the pseudo random number generator 45 provides multiple levels of security to insure that the battery pack 60 is properly authenticated and identified.

Upon selection of a key (also referred to as key material) from the key bank 52, the charger CPU 42 encrypts the key material using an encryption algorithm for generating a data stream that is ultimately sent to the battery pack 60 for authentication/identification. This is shown schematically as element 48. In an exemplary embodiment, the encryption algorithm is a conventional and publicly available algorithm known as AES.

The battery pack 60, as previously stated, is a smart battery containing an internal processing unit similar to the charger CPU 42. The battery pack 60 contains a battery pack CPU 62 that is electrically connected to the charger 40 via connections 70 and 72. Upon a specified event, such as when the pack 60 is inserted into the charger 40, a portion of the battery pack CPU executes a similar CHECKSUM function 66 as described with respect to the charger CPU 42. The CHECKSUM is based on the same pseudo random number generated by the charger CPU 42 and used to execute the CHECKSUM 50.

The battery pack CPU 62 also contains a key bank 68 similar to the key bank 52 described with respect to the charger CPU 42. The process for selecting an appropriate key index is the same process as performed by the charger CPU 42. More simply, the same processes are executed by the battery pack CPU 62 as in the charger CPU 42 when generating key material for encryption. Once the key material is selected from the key bank 68, the battery pack CPU 62 encrypts the selected key material and transmits the encrypted data stream to the charger CPU 42 via the bus line.

Finally, the charger CPU 42 compares the encrypted data stream from the charger 40 with the encrypted data stream from the battery pack 60 for determining whether the battery pack is or is not properly identified/authentic. If the charger CPU 42 determines that the encrypted data streams correspond, the battery is determined to be authentic and normal operations commence. Conversely, if the charger CPU 42 determines that the encrypted data streams do not correspond, normal operations of the charger 40 and battery pack 60 do not commence. In the exemplary embodiment, the charger CPU determines whether the two encrypted data streams correspond in making a final determination of whether the battery is or is not authentic. This final determination may be made by the battery pack CPU 62 or an intermediate processor.

With reference to the various elements of the block diagram of FIG. 4, a method for identification and encryption will now be described in conjunction with the flow diagrams of FIGS. 5-9.

Before executing the identification/authentication process, two separate events occur. First, the charger 40 is connected to an external power source (not shown). Second, the battery 60 is inserted, or otherwise connected to, the charger 40 to form an interconnection for data communication.

Upon connecting the charger 40 and battery 60, a microprocessor 62 in the battery executes a power-up routine for initializing the charging process (Step S1). The identification/authentication process is executed as part of the power-up routine.

Similarly, a processor 42 in the charger 40 will detect a timed event 43. In one embodiment, the processor 42 will perform successive reads on the least significant bits ("LSB"'s) of all, or a selected subset, of the A/D channels. Ideally the A/D channels used for this operation would meet the criteria that their values are non-zero and that they are connected to a variable source such as a temperature or other environmental measurement. The reading of the LSBs can be preformed on a single channel multiple times or multiple channels in succession until the required number of bits are obtained. In one exemplary embodiment, the charger 40 will perform this A/D channel read only when the charger 40 is first connected to an external power source. Other events may trigger the beginning of the authentication/identification process. The LSB's are then shifted into a seed register 44 having a predetermined or arbitrary number of resident bit locations. In the example embodiments, the message register may be either 64 or 128 bits. However other memory configurations may be used that do not depart from the spirit and scope of the invention.

This A/D read operation will be repeated to fill all, or a portion, of the bit locations in the seed register 44. In one embodiment, if a bit pattern occurs where a predetermined number of successive bits, for example 4 of 5 are equal, the fourth bit will be XOR'ed by 1 to ensure an asymmetric message start value. Other methods that use addition, multiplication or tabular functions to ensure an asymmetric message start value may also be employed.

The seed register 44, as part of a background process, will continually be updated using a series of xor-add and shift operations. These operations are structured to form a pseudo random number generator (PRNG) 45 for generating key material. The key material is information used as the focus of encrypt/decrypt process in identifying and authenticating the battery. The random number generator seed values ensure that the PRNG will generate highly unpredictable numbers with a high degree of entropy. Because the PRNG is continually updating and its output is triggered by the pack insertion, the output is very unpredictable.

Once generated, this key material will be used to execute the identification/authentication process. When the battery pack 60 connects with the charger 40, a message value is used for a challenge-response algorithm. This challenge response algorithm represents an event in which, effectively, the electronic device (i.e. the charger or the tool) sends a message to the battery and the battery responds. The details of this process are discussed hereinafter with reference to the accompanying figures. Because the start value of the message and the timing of pack insertion are random events, a high degree of improbability of the message value can be achieved. While one type of information is applied in the specific example, other similar events may be used for generating key material that does not depart from the scope and spirit of the invention.

In the exemplary embodiment, the charger 40 is responsible for verifying the authenticity of the battery pack 60. This operation could be initiated by either the electronic device, in this case the charger 40, or the battery 60. This is accomplished by sending the random number in the PRNG at the time of pack insertion to the battery pack (Step S6).

Both the pack 60 and charger 40 will encrypt this number using the Advanced Encryption Standard ("AES") algorithm. This function is executed by the processors 48 and 64. The AES algorithm is a symmetric-key lock cipher algorithm that supports block sizes of 128-bits, key sizes of 128-, 192-, and 256-bit. This algorithm is offered to the public and maintained by the United States' National Institute of Standards and Technology (NIST). One of the advantages associated with the AES algorithm is that is it free to the public through the terms of the NIST. This algorithm has been thoroughly tested and documented. While the AES algorithm is employed in the exemplary embodiment, other cryptographic tools and systems may be used.

The algorithm used on the pack 60 and on the charger 40 will be the same. After both units encrypt the number, the battery 60 will return the result to the charger 40, this result will be compared with the charger's own encryption (Step S11). If both of the results match, the charger will charge the battery pack (Step S13).

Figure 9:
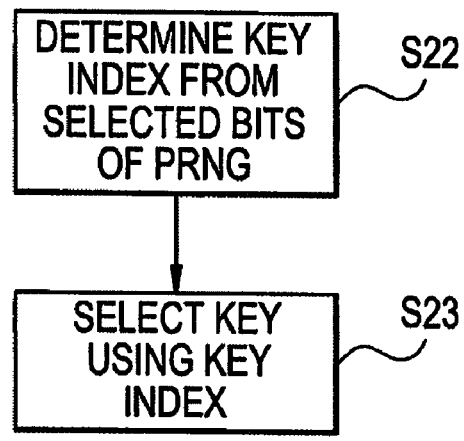
FIG. 9 is a flow diagram of a portion of an identification/authentication process according to an exemplary embodiment of the invention.

The AES algorithm used in this exemplary embodiment uses a 128 bit key to encrypt the message. For this particular illustration, there are multiple keys stored on both units. The specific key that will be used is determined by either a Checksum of the random message (FIG. 8) or by the values of arbitrarily selected bits of the random message (FIG. 9). The checksum could be a checksum the same length as the key index generated by adding or XORing all of the bits in the random message into a checksum. The use of multiple keys further ensures that the authentication measures cannot be circumvented. Further, the use of multiple keys makes it harder for unauthorized parties to circumvent the authentication measures.

In addition to a charger-battery combination as shown in FIG. 4, the same or similar methodology as described above and illustrated in FIGS. 5-9 may also be used to authenticate and identify the combination of a smart battery pack and smart tool. In this combination, the smart tool would not function without first authenticating that the smart battery pack is authentic.

What is claimed is:

1. A method for charging a smart battery, the method comprising:
   generating an encrypted random string using key material determined by a timed asynchronous random event as a seed value, wherein the encrypted random string includes a random string in an encrypted form, wherein the generating step includes selecting key material from one or more arbitrary keys stored in a key library based on A/D noise bits as a seed value; and
   transferring the random string to a device and decrypting the encrypted random string to recover the random string for authenticating the smart battery for operation, the device being electrically coupled to the smart battery.

2. The method of claim 1, wherein the generating step includes calculating a pseudo random number based on A/D noise bits as a seed value.

3. The method of claim 2, wherein the selecting key material step includes determining a key index from the pseudo random number.

4. The method of claim 2, wherein the pseudo random number is at least 8 bits.

5. The method of claim 2, wherein the pseudo random number is at least 64 bits.

6. The method of claim 2, wherein the pseudo random number is at least 128 bits.

7. The method of claim 3, wherein calculating a pseudo random number is fixed after reading A/D noise bits at a predetermined time.

8. The method of claim 3, wherein calculating a pseudo random number is variable after reading A/D noise bits at different time intervals.

9. The method of claim 1, wherein generating and transferring steps occur upon connection of the battery with the electronic device.

10. The method of claim 1, further comprising:
generating a second encrypted random string by said device using key material determined by A/D noise bits as a seed value wherein the second encrypted random string includes a random string in an encrypted form; and
comparing the first and the second encrypted random string to a device for authenticating the smart battery.

11. The method of claim 10, wherein the electronic device is a charger.

12. The method of claim 10, wherein the electronic device is a power tool.

13. A smart battery authentication system comprising: a smart battery, wherein the smart battery includes: a smart electronics device operable to generate a first encrypted random string using key material from one or more arbitrary key stored in a key library selected based on A/D noise bits as a seed value, wherein the encrypted random string includes a random string in an encrypted form; and an electronic device having a controller operable to generate a second encrypted random string based on A/D noise bits as a seed value and to receive the first encrypted random string to authenticate the smart battery;

a communications bus for electrically coupling the smart electronics to the controller; and the controller operable to authenticate the smart battery by comparing the first and second encrypted random strings.

14. The system of claim 13, wherein the smart battery calculates a pseudo random number based on A/D noise bits as a seed value.

15. The system of claim 14, wherein the smart battery selects key material by determining a key index from the pseudo random number.

16. The system of claim 15, wherein the smart battery calculates a pseudo random number after reading A/D noise bits at a fixed predetermined time.

17. The system of claim 15, wherein the smart battery calculates a pseudo random number after reading A/D noise bits at variable time intervals.

18. The system of claim 13, wherein the smart battery generates the first encrypted random string upon connection of the smart battery with the electronic device.

* * * * *

UNITED STATES PATENT AND TRADEMARK OFFICE
CERTIFICATE OF CORRECTION

Page 1 of 1

PATENT NO. : 7,941,865 B2
APPLICATION NO. : 11/554937
DATED : May 10, 2011
INVENTOR(S) : Andrew E. Seman, Jr. et al.

It is certified that error appears in the above-identified patent and that said Letters Patent is hereby corrected as shown below:

Title Page, (60) Related U.S. Application Data, insert the following heading and information:

--Related U.S. Application Data
(60) Provisional application No. 60/731,857, filed on Nov. 1, 2005.--.

Signed and Sealed this
Nineteenth Day of July, 2011

David J. Kappos
*Director of the United States Patent and Trademark Office*